Figure 1:
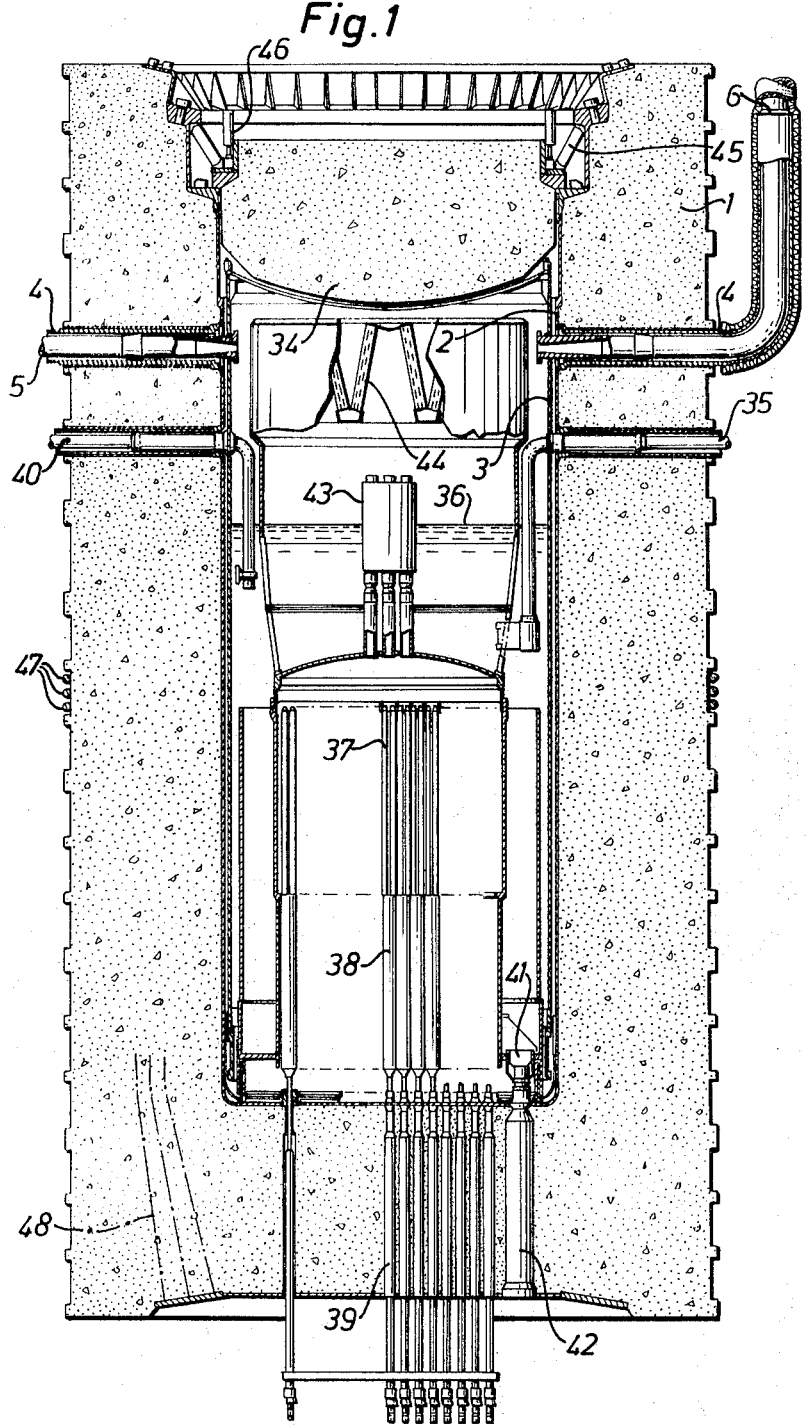

United States Patent [19]

Karker et al.

[11] 3,818,935

[45] June 25, 1974

[54] PRESSURE VESSEL

[75] Inventors: Stig Rutger Karker, Nykoping, Sweden; Knut Bratland, Slattum, Norway

[73] Assignee: Aktiebolag Atomenergi, Stockholm, Sweden

[22] Filed: Feb. 9, 1973

[21] Appl. No.: 330,945

[30] Foreign Application Priority Data
Feb. 24, 1972 Sweden................................ 2312/72

[52] U.S. Cl..................... 137/590, 176/61, 176/65, 285/47, 285/158, 285/179, 285/187
[51] Int. Cl............................................... F16l 11/12
[58] Field of Search...... 137/590; 285/47, 158, 187, 285/138, 179; 176/61, 86, 65

[56] References Cited
UNITED STATES PATENTS
3,033,595 5/1962 Bard ................................. 285/187
3,398,050 8/1968 Yevick et al...................... 176/61 X
3,488,067 1/1970 Sommer........................... 176/87 X Primary Examiner—Henry T. Klinksiek
Attorney, Agent, or Firm—Toren, McGeady and Stanger

[57] ABSTRACT

The invention relates to a pressure vessel having an external wall, lined internally with a liner, a vessel proper and at least one drain, and more specifically to a new construction of the drain, which e.g. enables the internal vessel to move slightly in relation to the main wall and its liner, in all directions. Should the drain fracture nevertheless, construction prevents any major escape of gas or liquid. This has been accomplished by extending the vessel and the liner in the form of coaxial internal and external tubes respectively, the double tube thus formed comprising first and second straight sections substantially at right angles to each other, or alternatively only comprising a second straight section, and the double tube forming a single tube beyond the second straight section of the internal tube.

11 Claims, 3 Drawing Figures

PRESSURE VESSEL

The present invention relates to a pressure vessel comprising an external wall, for example of concrete, lined internally with a liner and provided inside that with the vessel proper and also comprising a drain. More specifically the invention relates to a new construction of the drain of such a pressure vessel.

Pressure vessels of this kind are encountered amongst other things in nuclear power stations and hitherto, in such pressure vessels in water, gas and steam drains or discharges, have often been located in the tank base. The steam pipe has in this context been a pipe projecting up from the tank base and terminating freely inside the steam chamber. A pipe of this kind, however, has the major drawback that the water contained in the tank is entrained into the steam lines and reaches the turbine etc, if a failure occurs in that part of the pipe surrounded by the water.

The object of the invention is to provide a pressure vessel, by means of which the aforementioned drawback is avoided. The drain to the pressure vessel according to the invention is furthermore designed in such a way that it is possible for the internal vessel, usually a relatively thin-walled construction, to move slightly in relation to the main wall and its liner, in all directions, that is to say that the drain is designed to withstand normal thermal expansion. Should the drain fracture nevertheless, the design is so contrived that any major escape of gas or liquid is prevented.

The pressure vessel according to the present invention is characterized in that the drain is designed by extending the vessel in the form of an internal tube with a first straight section extending away from the vessel and a second straight section substantially at rightangles to the first; in that the liner is extended in the form of an external pressure-resistant tube which comprises first and second straight sections respectively coaxial with the first and second straight sections of the internal tube, or alternatively comprises only one straight section which is coaxial with the second straight section of the internal tube, thus forming a double tube comprising a first and a second straight section or a second straight section, the clearance between the internal and the external tubes being of such magnitude that the maximum movement occurring can take place freely; and in that internal and external tubes are connected with one another to form a single tube beyond that part of the double tube which contains the second straight section of the internal tube.

According to one embodiment of the invention, the bend in the double tube is formed outside the wall of the pressure vessel, that is to say that the first straight section of the double tube passes through said wall whilst the second straight section is located outside it.

According to another preferable embodiment, the first straight section of the internal tube is located inside the wall (liner) of the pressure vessel whilst its second straight section extends coaxially with the external tube which latter is now constituted purely by a single straight section, through said wall.

According to yet another preferable embodiment of the invention, the space between the two tubes is provided, just outside the point of connection of the external tube to the pressure vessel liner, with a flexible restrictor which on the one hand, within said space between the two tubes separates the hot gas from the cold gas in the space between liner and interior vessel, and on the other hand limits the leakage from said latter space in the event of any rupture of the external tube.

Preferably, the internal tube, at the point of transition to the location where the external tube is secured to liner, will be equipped with a restrictor nozzle to limit the escape of steam from the vessel, in the event of any fracture of the double tube or its extension.

The external tube can furthermore conveniently be provided at its point of attachment to the liner with a mobile restrictor means or element which restricts leakage from the space between liner and vessel in the event of any fracture of the external tube, because under high pressure the aforesaid flexible restrictor does not generally have an adequate flow-limiting effect in the event of a failure.

Figure 2:
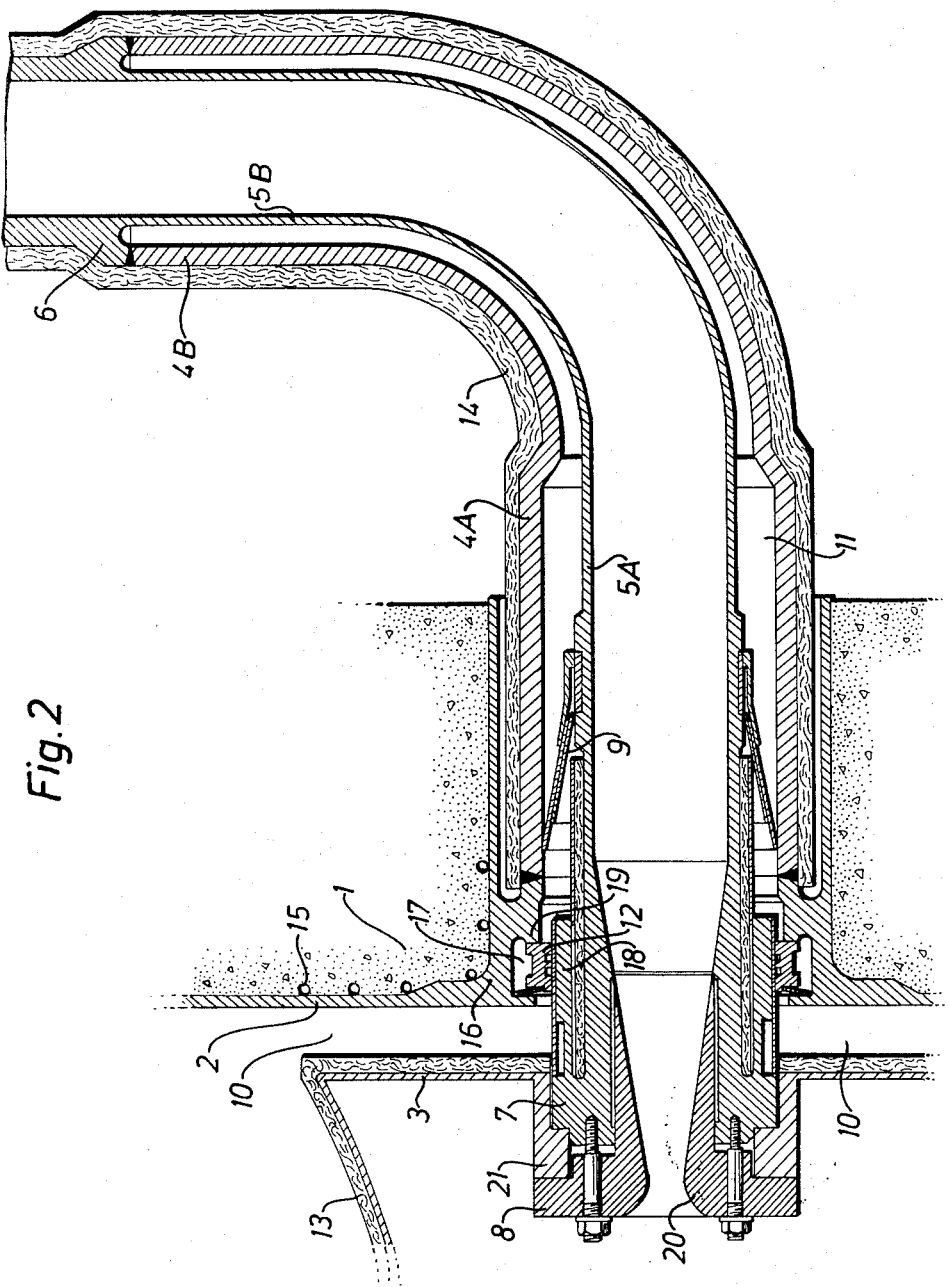
Figure 3:
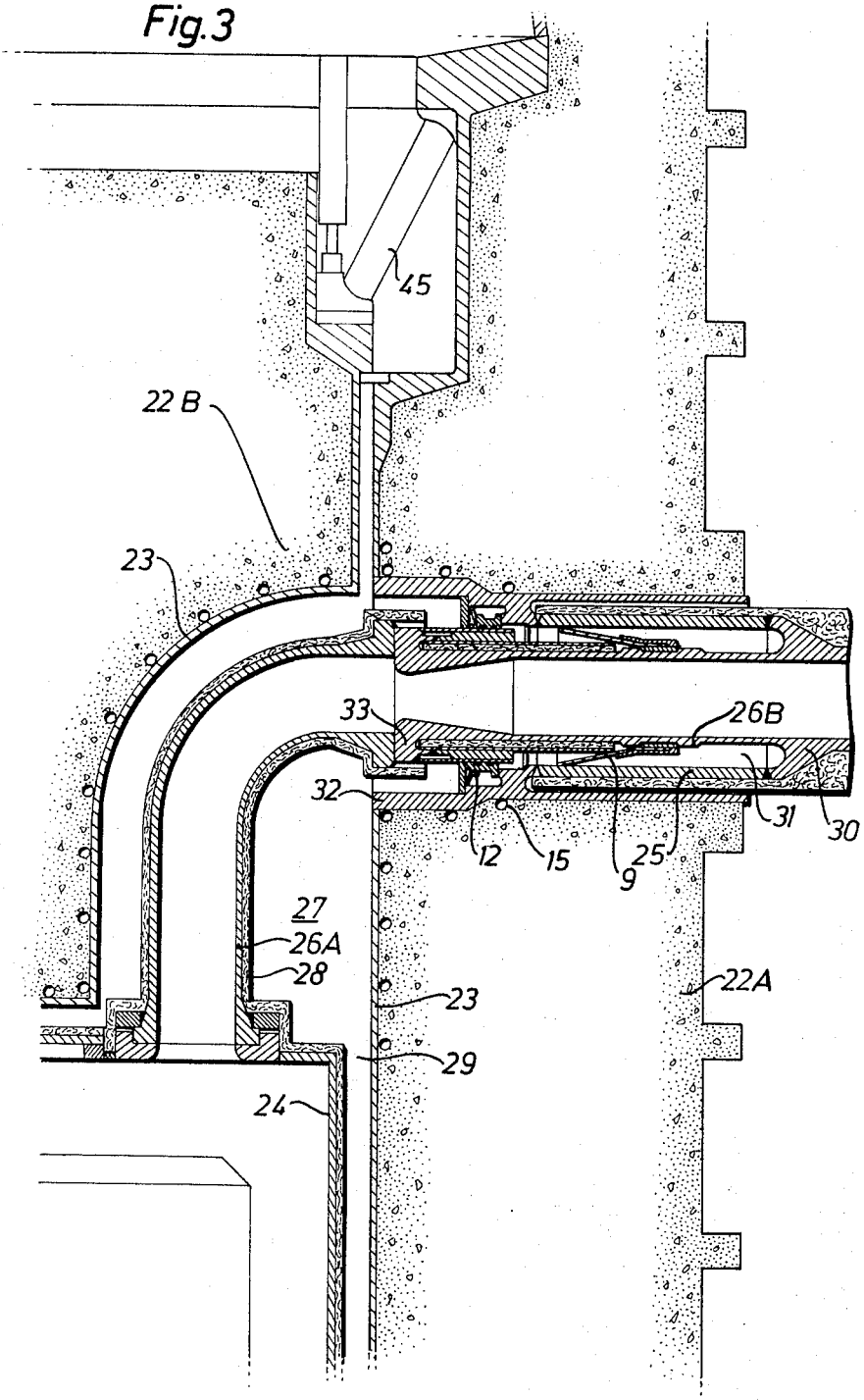

In the following, the invention will be described in more detail making reference to the attached drawing of which FIG. 1 shows an axial cross section of an embodiment of the pressure vessel according to the invention, FIG. 2 is an enlarged axial cross-section through one of the drains which are shown in FIG. 1, and FIG. 3 illustrates an axial cross section of another embodiment of the drain.

FIG. 1 illustrates the thick-walled concrete pressure vessel of an nuclear power station, in which pressure vessel, the concrete preferably prestressed, as is schematically shown by the horizontally and vertically extending prestressing cables 47 and 48 respectively. The wall 1 is provided with a steel liner 2 and inside the latter there is a thin-walled vessel 3 the lower end of which contains the fissionable fuel in the form of fuel elements 37, and the water 36 used to cool said fuel, and the upper end of which contains the steam created by the boiling of the water. For the control of the intensity of the chain reaction there are used control rods, which run in the guide tubes 38 and which, dependent on how far they are pushed in between said fuel elements 37, to a more or less great extent absorb the neutrons liberated at the reaction. The position of the control rods in the so-called reactor core, i.e. the place where the fuel elements 37 are positioned, is controlled by means of the driving devices 39. For the circulation of the water 36 through the core there are used circulation pumps 41 (one is shown in FIG. 1), which are run by means of motors 42. From the figure there is also seen that the pressure vessel is provided with a closure 34, which is held in position by struts 45 and jacks 46.

The energy liberated at the chain reaction is used to boil the water 36. The steam formed is passed through water-steam separators 43 and through steam dryers 44. The dry steam from said dryers 44 is then removed through any of steam drains 4, 5 which are provided through the side of the upper part of the concrete wall 1. The drain shown at the top to the right of the figure represents the embodiment where the bend in the double tube has been formed outside the wall of the pressure vessel, which embodiment is shown more in detail in FIG. 2. The drain shown at the top to the left of FIG. 1 is in turn identical with first-mentioned drain shown to the right, even if, in this case, the bend in the tube is not shown.

The steam removed by the steam drains is used in one or more turbines (not shown) and is recycled, in condensed form, to the pressure vessel via one or more feed water pipes 35, one of which is shown in the figure. If, for some reason, the whole heat energy is not taken out or cannot be taken out in the form of steam through the drain leading to the turbine, one or more pipes for shut down cooling 40 can be utilized, through which hot water is drained cooled outside the reactor and recycled via the feed water pipes 35. In the case when the reactor core is insufficiently supplied with feed water through the pipe 35 there are also one or more pipes for emergency cooling of said core. There is shown no such pipe in the figure but in principle it can be designed in the same way as the pipe 40. As was mentioned above there are generally used more than one pipe of each type, e.g. 4 feed water pipes, 2 pipes for shut down cooling and 4 pipes for emergency cooling.

FIG. 2 illustrates an enlarged view of one of the drains from FIG. 1. The reference numeral 1 refers to the upper part of the concrete wall, which is provided with a steel liner 2. Inside the latter there is the vessel 3, which can be thinwalled because it is not load-bearing, the gap 10 between the liner 2 and the vessel 3 being filled with cold gas of substantially the same pressure as the steam in the vessel 3. The gas in the gap 10 can be kept quite cool throughout by providing the vessel 3 with external insulation 13. In order to prevent the concrete of the pressure vessel from being heated up, furthermore cooling passages 15 are arranged at the outside of the liner 2. The steam vent (drain, discharge etc.) is formed by extending the steel liner 2 to form an external pressure-resistant tube 4A and 4B, and by extending the vessel 3 to form an internal tube 5A and 5B, coaxial with the external tube, the clearance between the two being sufficient to accommodate the maximum movement which occurs. In order for the tubes 4 and 5 to be able to accommodate both axial and radial movements between liner 2 and vessel 3, they are each extended in the form of a first straight section 4A and 5A, projecting from the liner 2 and the vessel 3 respectively, and thereafter in the form of another straight section 4B and 5B respectively, substantially at rightangles to the respective first sections 4A and 5A. The two coaxial tubes 4 and 5 are connected together to form a single tube 6, beyond said second straight sections 4B and 5B. As the figure shows, the double tube is in this case bent outside the wall 1.

In order to reduce the thermally induced movements between tubes 4 and 5 with temperature changes in the vessel 3 and the steam which it contains, the space 11 between tubes 4 and 5 is filled with gas the majority of which acquires the steam temperature in the vessel 3 and the tube 5, i.e. the tube 5 is not provided with any insulation. It thus follows that the tube 4 acquires approximately the same temperature as the tube 5 and the relative movements between tubes 4 and 5, due to thermal expansion, remain small. To reduce heat losses to the environment, the tube 4 is provided with external insulation 14.

In the space 11 between the two tubes 4A and 5A, there is a flexible ring 9 of frusto-conical form, the smaller end of which is secured in a groove in the exterior of said internal tube 5A, and the larger end of which bears freely against the inside of the external tube 4A. Said ring 9 is intended primarily to separate the hot gases in the space 11 from the cold gases in the space 10, but can also be used, at least at relatively low pressure, to limit leakage of gas from the space 10 in the event of any fracture in said external tube 4. In the event of a fracture, the larger end of the ring 9 is exposed to the gas pressure in the space 10 and forced even harder than normally into contact with the tube 4A.

As a primary protection against the quick escape of gas from the space 10 in the event of a fracture in the external tube 4, however, the said tube 4 is provided at its point of attachment 16 to the liner 2 with an axially slidable ring 12. Said ring 12 is arranged in a recess 17 in the fixing 16, and bears in a sealing fashion against a second portion 18 of the internal tube 5A forming the junction with its point of attachment 7 to the vessel 3, although at the same time it is able to slide over said thickened portion. With any reduction in pressure in the space 11, the ring 12 is forced by the gas pressure in the space 10 against a stop face 19 on the fixing 16, to provide a good seal for the inlet to the space 11.

To limit the escape of steam from the vessel 3 in the eventuality of fracture in the double tube 4 and 5, or its extension 6, the tube 5, at its point of attachment 7 to the vessel 3, is equipped with a restrictor nozzle 20 of conventional design. The nozzle 20 is equipped with a flange 8 and it is flange-connected to the inner tube 5A via its fixing 7. Because the fixing 21 linking the vessel 3 to the internal tube 5A, is so designed that it fits within and bears against the flange 8 and fixing 7, said flange connection also provides the attachment between the vessel 3 and the internal tube 5A.

FIG. 3 illustrates the embodiment of the invention in which the bend in the inner tube is formed inside the external wall of the pressure vessel, the external tube being constituted purely by a straight section outside the second straight section of the internal tube. References which are the same as those used in FIG. 2 relate to identical details in both embodiments.

The figure thus illustrates a pressure vessel with a thick external wall 22 which in this case is subdivided into a sidewall 22A and a cover 22B. The sidewall 22A and cover 22B are internally lined with a liner 23 extended to form an external pressure-resistant tube 25 passing through sidewall 22A. Inside the liner 23 there is the vessel proper 24 for the gas or liquid, which vessel is extended upwards in the form of an internal tube 26A, 26B bent inside the wall 22 of the pressure vessel, its second straight section 26B being coaxial with said external tube 25, thus forming a double tube. The internal tube 26A, 26B is able to be taken upwards in the form of straight section 26A inside the wall 22, by virtue of the fact that a recess 27 is formed in the cover 22B. This means amongst other things that the gas volume in the space 29 between the insulated internal vessel 24, and the liner 23 is increased. Furthermore, all that part of the internal tube 26 which is located inside the wall 22, must be provided with insulation 28 in order to keep cool the gas in the space 29 and recess 27. Said first straight section 26A then transfers to a second straight section 26B which makes an angle of 90° with the first straight section and is coaxial with the external tube 25 which passes through the sidewall 22A. The tubes 25 and 26 are connected together to form a single tube 30 outside the of the sidewall 22A.

In the space 31 between the external tube 25 and the second straight section 26B of the internal tube, there is a flexible ring 9 the appearance and operation of which correspond with those of the corresponding ring in FIG. 2. The same applies to the axially slidable ring 12 arranged in the fixing 32 securing the external tube 25 to the liner 23.

To limit leakage from the vessel 24 in the event of any fracture in the double tube 25 and 26B, or its extension 30, the internal tube 26, as is the case with the internal tube of FIG. 2, is equipped with a restrictor nozzle 33. In this case, however, the restrictor or throttling nozzle is arranged at the junction to the second straight section 26B of the internal tube, that is to say centrally at the point of connection 32 of the external tube 25 to the liner 23.

Although the foregoing detailed description of the pressure vessel according to the invention actually refers to a vent or a drain for leading steam from a concrete vessel in a nuclear power station, the present invention is in no way restricted to this. The invention naturally relates to any drain (vent, discharge etc.) for any gas or fluid from any pressure vessel of the kind set out in the main claim. Furthermore, the design of the external and internal tubes, and of the junction between the liner and the external tube, and again of that between the vessel and the internal tube, can deviate from that shown in the drawings without in so doing losing the advantages set out hereinbefore. Thus, for example, the angle between the vessel and the first section of the internal tube and/or the angle between the first and second sections of the internal tube, need not be exactly 90° and the relative proportions of the aforesaid first and second sections are in no way limited to what has been illustrated in the drawing. Furthermore, the double tube can be arranged to pass through the cover of the pressure vessel or even through its base (in the case when the pressure vessel is so designed that there is no risk of the water leaking through the steam lines and penetrating to the turbine), and in these cases too, the tube bend can be located either outside or inside the pressure vessel wall. The term "wall" is intended here to indicate either the side wall, the cover or the base. The principle of the invention is self-evidently equally applicable to any other embodiment, rendered obvious by the foregoing statements to the person skilled in the art, of the restrictor arrangement, restrictor nozzle or restrictor means, and the illustrated flexible ring, restrictor nozzle or axially slidable ring in no way constitute any limitation of the invention.

What is claimed is:

1. A pressure vessel comprising a tubular-shaped external wall, a liner positioned on and lining the inner surface of said external wall, a vessel positioned within said external wall and spaced inwardly from said liner forming a space therebetween, a drain connected to said vessel and extending through said liner and external wall, said drain comprising at least a double tube portion extending through said liner and external wall, said double tube portion comprising an internal tube connected at its inner end to said vessel and an external tube secured to said liner and external wall, said drain comprising a first straight section and a second straight section and said first and second sections arranged approximately at right angles to one another, said drain including a single tube connected to said internal and external tube exteriorly of said external wall, and said external tube being spaced outwardly from said inner tube and the clearance therebetween being of such a magnitude that the maximum movement can take place freely between said vessel and external wall and said vessel can move in any direction relative to said liner and external wall.

2. A pressure vessel, as set forth in claim 1, wherein said external wall is formed of concrete and said liner is formed of metal, said first straight section of said drain extends through said liner and external wall and said second straight section is located exteriorly of said external wall, said first straight section comprises a portion of said external tube which is secured to and extends outwardly from said liner and the portion of said internal tube which is secured to and extends in a straight line from said vessel, and in said first straight section said internal tube is spaced inwardly from said external tube forming an annular space therebetween, and said external tube is a pressure-resistant member.

3. A pressure vessel, as set forth in claim 2, wherein a flexible restrictor is located within and encircles said internal tube in the annular space between said external tube and internal tube in said first straight tube section, and said flexible restrictor is frusto-conical in shape and is seated at its end located more remote from said liner within the outer surface of said internal tube and its end closer to said liner is in contact with the inner surface of said external tube.

4. A pressure vessel, as set forth in claim 2, wherein a restrictor nozzle is positioned within and limits the flow passageway through said internal tube at its connection to said vessel, said restrictor nozzle extends axially through said internal tube in the range of the attachment of said external tube to said liner, and said restrictor nozzle arranged to limit the escape of fluid from said vessel in the event of rupture of said double tube portion or of said single tube extending downstream from said double tube portion.

5. A pressure vessel, as set forth in claim 2, wherein an axially slidable ring is positioned within the space in said double tube portion extending through said external wall between said external tube and internal tube, said ring disposed in contact with said external tube and internal tube and located adjacent the attachment of said external tube to said liner, said ring arranged to limit leakage from the space between said vessel and liner in the event of any rupture in said external tube.

6. A pressure vessel, as set forth in claim 2, wherein a flexible restrictor is located within and encircles said internal tube in the annular space between said external tube and internal tube in said first straight tube section, said flexible restrictor is frusto-conical in shape and its end located more remote from said liner is seated within the outer surface of said internal tube and its end located closer to said liner is in contact with the inner surface of said external tube, a restrictor nozzle positioned within and limiting the flow passageway through said internal tube at its connection to said vessel, said restrictor nozzle extending axially through said internal tube in the range of the attachment of said external tube to said liner and upstream from the point at which said flexible restrictor is seated in the exterior surface of said internal tube, said restrictor nozzle arranged to limit the escape of fluid from said vessel in the event of rupture of said double tube portion or said single tube extending downstream from said double tube portion, an axially slidable ring positioned within the space in said double tube portion extending through said external wall between said external tube and internal tube, said ring disposed in contact with said external tube and internal tube and located adjacent the attachment of said external tube to said liner and in the range of said restrictor nozzle extending through said internal tube, and said ring arranged to limit leakage from the space between said vessel and liner in the event of any rupture in said external tube.

7. A pressure vessel, as set forth in claim 1, wherein said external wall is formed of concrete and said liner is formed of metal, said first straight section of said drain is located inwardly from said liner and external wall and said second straight section extends through said liner and external wall, said first straight section consists of the portion of said internal tube which is secured to and extends in a straight line from said vessel, and said second straight section consists of said external tube which is secured to and extends outwardly from said liner and a portion of said internal tube disposed at right angles to the portion of said internal tube which extends from said vessel, said external tube is a pressure-resistant member, and in said second straight section said external tube is spaced outwardly from said internal tube and forms an annular space therebetween.

8. A pressure vessel, as set forth in claim 7, wherein a flexible restrictor is located within and encircles said internal tube in the annular space between said external tube and internal tube in said second straight tube section, and said flexible restrictor is frusto-conical in shape and its end located more remote from said liner is seated within the outer surface of said internal tube and its end closer to said liner is in contact with the inner surface of said external tube.

9. A pressure vessel, as set forth in claim 7, wherein a restrictor nozzle is positioned within and limits the flow passageway through said internal tube in the range of said double tube portion where said external tube is secured to said liner and extends outwardly through said external wall, said restrictor nozzle located in said second straight section, and said restrictor nozzle extending axially through said internal tube and arranged to limit the escape of fluid from said vessel in the event of rupture of said double tube portion or of said single tube extending downstream from said double tube portion.

10. A pressure vessel, as set forth in claim 7, wherein an axially slidable ring is positioned within the space in said double tube portion extending through said external wall between said external tube and internal tube, said ring disposed in contact with said external tube and internal tube and located adjacent the attachment of said external tube to said liner, said ring arranged to limit leakage from the space between said vessel and liner in the event of any rupture in said external tube.

11. A pressure vessel, as set forth in claim 7, wherein a flexible restrictor is located within and encircles said internal tube in the annular space between said external tube and internal tube in said second straight tube section, said flexible restrictor is frusto-conical in shape and its end located more remote from said liner is seated within the outer surface of said internal tube and its end closure to said liner is in contact with the inner surface of said external tube, a restrictor nozzle positioned within and limiting the flow passageway through said internal tube in said second straight tube section located in the range of said double tube portion where said external tube is secured to said liner and extends outwardly through said external wall, said restrictor nozzle is arranged to limit the escape of fluid from said vessel in the event of rupture of said double tube portion or of said single tube extending downstream from said double tube portion, an axially slidable ring positioned within the space in said double tube portion extending through said external wall between said external tube and internal tube, said ring disposed in contact with said external tube and internal tube and located adjacent the attachment of said external tube to said liner and in the range of said restrictor nozzle, and said ring arranged to limit leakage from the space between said vessel and liner in the event of any rupture in said external tube.

* * * * *